(12) United States Patent
Rappoport et al.

(10) Patent No.: US 6,631,445 B2
(45) Date of Patent: Oct. 7, 2003

(54) CACHE STRUCTURE FOR STORING VARIABLE LENGTH DATA

(75) Inventors: Lihu Rappoport, Haifa (IL); Stephan J. Jourdan, Portland, OR (US); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/372,194

(22) Filed: Feb. 25, 2003

(65) Prior Publication Data

US 2003/0131183 A1 Jul. 10, 2003

Related U.S. Application Data

(63) Continuation of application No. 09/713,266, filed on Nov. 16, 2000, now Pat. No. 6,549,987.

(51) Int. Cl.[7] .............................................. G06F 12/00
(52) U.S. Cl. ....................... 711/128; 711/129; 711/140; 365/49; 712/239
(58) Field of Search ................. 711/127–129, 133–134, 711/140; 712/239; 365/49

(56) References Cited

U.S. PATENT DOCUMENTS

| | | | |
|---|---|---|---|
| 4,905,141 A | * 2/1990 | Brenza | 711/129 |
| 5,381,533 A | 1/1995 | Peleg et al. | |
| 5,796,978 A | * 8/1998 | Yoshioka et al. | 711/206 |
| 6,128,704 A | * 10/2000 | Jun | 711/140 |
| 6,167,510 A | * 12/2000 | Tran | 712/239 |
| 6,327,643 B1 | * 12/2001 | Egan | 711/134 |
| 6,349,364 B1 | * 2/2002 | Kai et al. | 711/133 |

OTHER PUBLICATIONS

Black et al, "The Block–Based Trace Cache", Proceedings of The 26th Int'l. Symposium on Computer Architecture, May 2–4, 1999, Atlanta, Georgia.

Conte et al, "Optimization of Instruction Fetch Mechanisms for High Issue Rates", Proceedings of The 22nd Annual Int'l. Symposium on Computer Architecture, Jun. 22–24, 1995, Santa Margherita Ligure, Italy.

Dutta et al, "Control Flow Prediction with Tree–Like Subgraphs for Superscalar Processors", Proceedings of The 28th Int'l. Symposium on Microarchitecture, Nov. 29–Dec. 1, 1995, Ann Arbor, Michigan.

Friendly et al, "Alternative Fetch and Issue Policies for the Trace Cache Fetch Mechanism", Proceedings of The 30th Annual IEEE/ACM Int'l. Symposium on Microarchitecture, Dec. 1–3, 1997, Research Triangle Park, North Carolina.

Intrater et al, "Performance Evaluation of a Decoded Instruction Cache for Variable Instruction–Length Computers", Proceedings of The 19th Annual Int'l. Symposium on Computer Architecture, May 19–21, 1992, Gold Coast, Australia.

(List continued on next page.)

Primary Examiner—Nasser Moazzami
(74) Attorney, Agent, or Firm—Kenyon & Kenyon (57) ABSTRACT

A cache architecture is adapted to store data items of variable length. Given appropriate circumstances, the cache architecture permits multiple data items to be retrieved from the cache in single clock cycle. The cache architecture may find application in a front end processing system of a processor storing instruction segments. If a first instruction segment does not occupy the full width of the cache, other instruction segments can be retrieved from the cache simultaneously with the first instruction segment. The cache may be organized into a plurality of cache banks, each cache bank being independently addressed. Each bank may consist of several cache ways.

19 Claims, 7 Drawing Sheets

OTHER PUBLICATIONS

Jacobson et al, "Path–Based Next Trace Prediction", Proceedings of The 30$^{th}$ Annual Int'l. Symposium on Microarchitecture, Dec. 1–3, 1997, Research Triangle Park, North Carolina.

McFarling, Scott, "Combining Branch Predictors", Jun. 1993, WRL Technical Note TN–36, Digital Western Research Laboratory, Palo Alto, California.

Michaud et al, "Exploring Instruction–Fetch Bandwidth Requirement in Wide–Issue Superscalar Processors", Proceedings of The 1999 Int'l. Conference on Parallel Architectures and Compilation Techniques, Oct. 12–16, 1999, Newport Beach, California.

Patel et al, "Improving Trace Cache Effectiveness with Branch Promotion and Trace Packing", Proceedings of The 25$^{th}$ Annual Int'l. Symposium on Computer Architecture, Jun. 27–Jul. 1, 1998, Barcelona, Spain.

Reinman et al, "A Scalable Front–End Architecture for Fast Instruction Delivery", Proceedings of The 26$^{th}$ Int'l. Symposium on Computer Architecture, May 2–4, 1999, Atlanta, Georgia.

Rotenberg et al, "Trace Cache: A Low Latency to Approach High Bandwidth Instruction Fetching", Proceedings of The 29$^{th}$ Annual IEEE/ACM Int'l. Symposium on Microarchitecture, MICRO–29, Dec. 2–4, 1996, Paris, France.

Seznec et al, "Multiple–Block Ahead Branch Predictors", Proceedings of The 7$^{th}$ Int'l. Conference on Architectural Support for Programming Languages and Operating Systems, Oct. 1–4, 1996, Cambridge, United States.

Yeh et al, "Increasing the Instruction Fetch Rate via Multiple Branch Prediction and a Branch Address Cache", Proceedings of The 7$^{th}$ Int'l. Conference on Supercomputing, Jul. 1993.

* cited by examiner

BANK VECTORS
IS2  0 1 1 0
IS1  1 0 0 1

Set 15
Set 23
Output bank0, bank1, bank2, bank$_{N-1}$

FIG. 6
600

BANK VECTORS
IS2  0 0 1 1
IS1  1 0 0 1

Set 15
Set 23
Output bank0, bank1, bank2, bank$_{N-1}$

CACHE STRUCTURE FOR STORING VARIABLE LENGTH DATA

CROSS-REFERENCE TO RELATED APPLICATION

This application is a continuation application that claims the benefit of U.S. patent application Ser. No. 09/713,266 filed Nov. 16, 2000 now U.S. Pat. No. 6,549,987, allowed Jan. 14, 2000, which application is incorporated herein in its entirety.

BACKGROUND

The present invention relates to a cache architecture for variable length data. When used in a processor core, the cache architecture can support storage of variable length instruction segments and can retrieve multiple instruction segments (or portions thereof in a single clock cycle. The cache architecture also contributes to minimized fragmentation of the instruction segments.

Figures 1, 2:
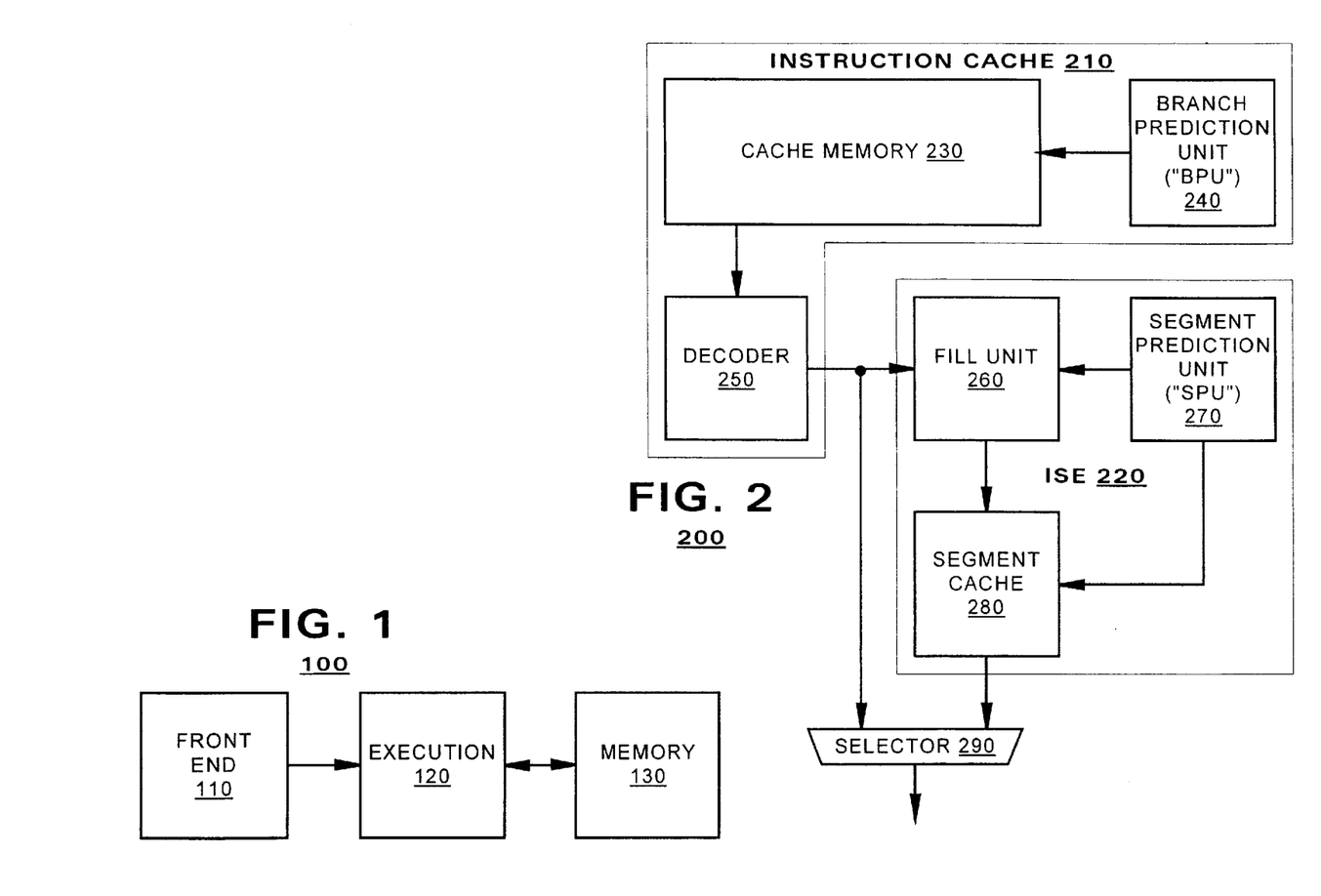
FIG. 1 is a block diagram illustrating the process of program execution in a conventional processor.
FIG. 2 is a block diagram of a front end processing system according to an embodiment of the present invention.

FIG. 1 is a block diagram illustrating the process of program execution in a conventional processor. Program execution may include three stages: front end 110, execution 120 and memory 130. The front-end stage 110 performs instruction pre-processing. Front end processing 110 is designed with the goal of supplying valid decoded instructions to an execution unit 120 with low latency and high bandwidth. Front-end processing 110 can include instruction prediction, decoding and renaming. As the name implies, the execution stage 120 performs instruction execution. The execution stage 120 typically communicates with a memory 130 to operate upon data stored therein.

Conventionally, front end processing 110 may build instruction segments from stored program instructions to reduce the latency of instruction decoding and to increase front-end bandwidth. Instruction segments are sequences of dynamically executed instructions that are assembled into logical units. The program instructions may have been assembled into the instruction segment from non-contiguous regions of an external memory space but, when they are assembled in the instruction segment, the instructions appear in program order. The instruction segment may include instructions or uops (micro-instructions).

A trace is perhaps the most common type of instruction segment. Typically, a trace may begin with an instruction of any type. Traces have a single entry, multiple exit architecture. Instruction flow starts at the first instruction but may exit the trace at multiple points, depending on predictions made at branch instructions embedded within the trace. The trace may end when one of number of predetermined end conditions occurs, such as a trace size limit, the occurrence of a maximum number of conditional branches or the occurrence of an indirect branch or a return instruction. Traces typically are indexed by the address of the first instruction therein.

Other instruction segments are known. The inventors have proposed an instruction segment, which they call an "extended block," that has a different architecture than the trace. The extended block has a multiple-entry, single-exit architecture. Instruction flow may start at any point within an extended block but, when it enters the extended block, instruction flow must progress to a terminal instruction in the extended block. The extended block may terminate on a conditional branch, a return instruction or a size limit. The extended block may be indexed by the address of the last instruction therein.

A "basic block" is another example of an instruction segment. It is perhaps the most simple type of instruction segment available. The basic block may terminate on the occurrence of any kind of branch instruction, including an unconditional branch. The basic block may be characterized by a single-entry, single-exit architecture. Typically, the basic block is indexed by the address of the first instruction therein.

Regardless of the type of instruction segment used in a processor 110, the instruction segment typically is cached for later use. Reduced -latency is achieved when program flow returns to the instruction segment because the instruction segment may store instructions already assembled in program order. The instructions in the cached instruction segment may be furnished to the execution stage 120 faster than they could be furnished from different locations in an ordinary instruction cache.

Caches typically have a predetermined width; the width determines the maximum amount of data that could be retrieved from cache in a single clock cycle. The width of a segment cache typically determines the maximum size of the instruction segment. To retrieve data, a cache address is supplied to the cache, which causes contents of a cache entry to be driven to a cache output.

Because instruction segments are terminated based on the content of the instructions from which they are built, the instruction segments typically have variable length. So, while a segment cache may have capacity to store, say, 16 instructions per segment, the average length of the instructions segments may be much shorter than this maximum length. In fact, in many typical applications, an average instruction segment length is slightly more than 8 instructions per segment. If these instruction segments were stored in a traditional segment cache, the capacity of the segment cache may be under-utilized; the 8-instruction segment would prevent excess capacity in a much larger cache line from storing other data. Further, a traditional segment cache would output the smaller instruction segment, when addressed, even though it may have the capacity for much larger data items.

Accordingly, there exists a need in the art for a cache structure that stores variable length data and can output data with higher utilization than would be provided by a traditional cache.

DETAILED DESCRIPTION

Embodiments of the present invention provide a cache architecture adapted to store data items of variable length.

The cache may be populated by a number of independently addressable banks. If a data item occupies fewer than the total number of banks, unoccupied banks may be used to store other data items. The cache architecture contributes to higher utilization because data from multiple instruction segments may be read from a cache simultaneously.

FIG. 2 is a block diagram of a front end processing system 200 according to an embodiment of the present invention. The front end 200 may include an instruction cache 210 and an instruction segment engine ("ISE") 220. The instruction cache 210 may be based on any number of known architectures for front-end systems 200. Typically, they include an instruction cache or memory 230, a branch prediction unit ("BPU") 240 and an instruction decoder 250. Program instructions may be stored in the cache memory 230 and indexed by an instruction pointer. Instructions may be retrieved from the cache memory 230, decoded by the instruction decoder 250 and passed to the execution unit (not shown). The BPU 240 may assist in the selection of instructions to be retrieved from the cache memory 230 for execution. As is known, instructions may be indexed by an address, called an "instruction pointer" or "IP."

According to an embodiment, an ISE 220 may include a fill unit 260, a segment prediction unit ("SPU") 270 and a segment cache 280. The fill unit 260 may build the instruction segments. The segment cache 280 may store the instruction segments. The SPU 270 may predict which instruction segments, if any, are likely to be executed based on a current state of program flow. It may cause the segment cache 280 to furnish any predicted segment to the execution unit. The SPU 270 may generate prediction data for each of the instruction segments stored by the segment cache 280.

The ISE 220 may receive decoded instructions from the instruction cache 210. The ISE 220 also may pass decoded instructions to the execution unit (not shown). A selector 290 may select which front-end source, either the instruction cache 210 or the ISE 220, will supply instructions to the execution unit. In an embodiment, the segment cache 280 may control the selector 290.

Figure 3:
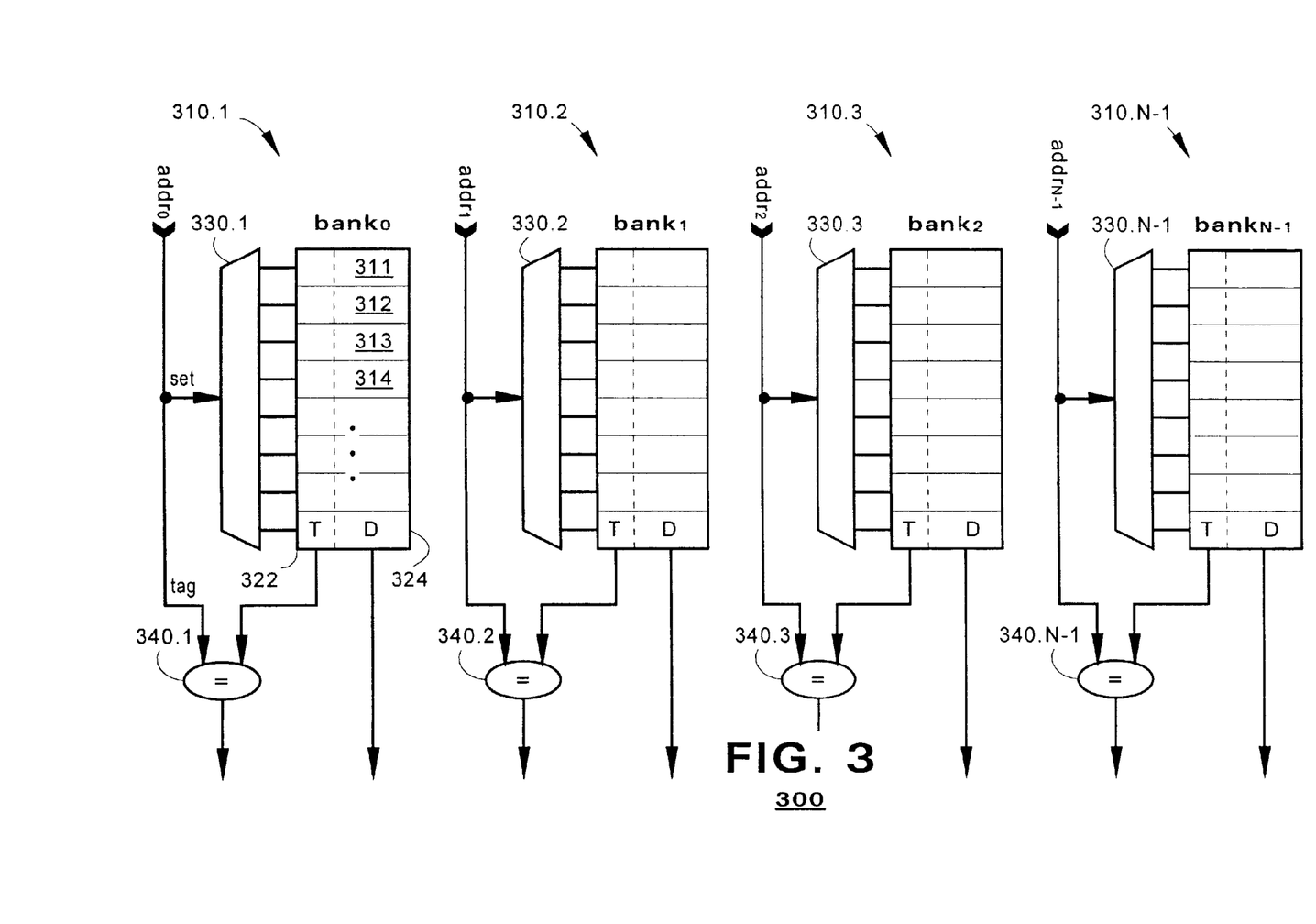
FIG. 3 is a block diagram of a segment cache according to an embodiment of the present invention.

FIG. 3 illustrates a cache 300 according to an embodiment of the present invention. This structure may be appropriate for use as the segment cache 280 of FIG. 2. According to an embodiment, the cache structure 300 may be populated by a number of cache banks 310.1–310.N–1. The cache banks 310.1–310.N–1 each may include a plurality of cache lines 311, 312, 313, 314. The sets typically have uniform width and may be tailored to store an integral number of instructions. The cache lines 311 may maintain two fields. A first field, called a tag field 322, may store a tag associated with the data. The tag may be derived from the IP on which the instruction segment stored in the cache line 311 is indexed. The second field, called a data field 324, may store instruction data from the instruction segment.

The cache 300 may accept separate address signals for each of the banks ($addr_0$–$addr_N$). In the example shown in FIG. 3, address decoders 320.1–320.N–1 access the cache lines based upon respective input addressing signals 330.1–330.N–1. Each bank 310.1–310.N–1 may be addressed independently of the other banks. A cache line (say, 311) typically is addressed by a portion of an instruction pointer, called a "set."

Each cache bank 310.1–310.N–1 may include its own tag comparator 340.1, 340.2, 340.3, . . . , 340.N–1. Each tag comparator (say, 340.1) has two inputs. A first input is provided in communication with the tag fields 322 of the cache lines 311 in the respective bank 310.1. The tag comparator 340.1 will receive tag data from one of the cache lines that is addressed by the address decoder 330.1. A second input receives a tag portion of an externally supplied address. Thus, the tag comparator 340.1 may compare an externally supplied tag with tag data stored in an addressed cache line (say, 311). When the two tags agree, the tag comparator 340.1 may generate an output identifying a tag hit. Hit/miss outputs from the tag comparators 340.1–340.N–1 may be output to the selector 290 (FIG. 2).

For each clock cycle, the cache 300 may output data having a width that is determined by the cumulative width of the cache lines of all the banks 310.1–310.N–1. As noted, however, different cache lines in each bank may be addressed independently of the other. If two or more instruction segments are stored in non-overlapping banks, it is possible to retrieve them from the cache 300 during a single clock cycle. Even when instruction segments partially overlap banks, it is possible to retrieve data in excess of one instruction segment.

Figure 4:
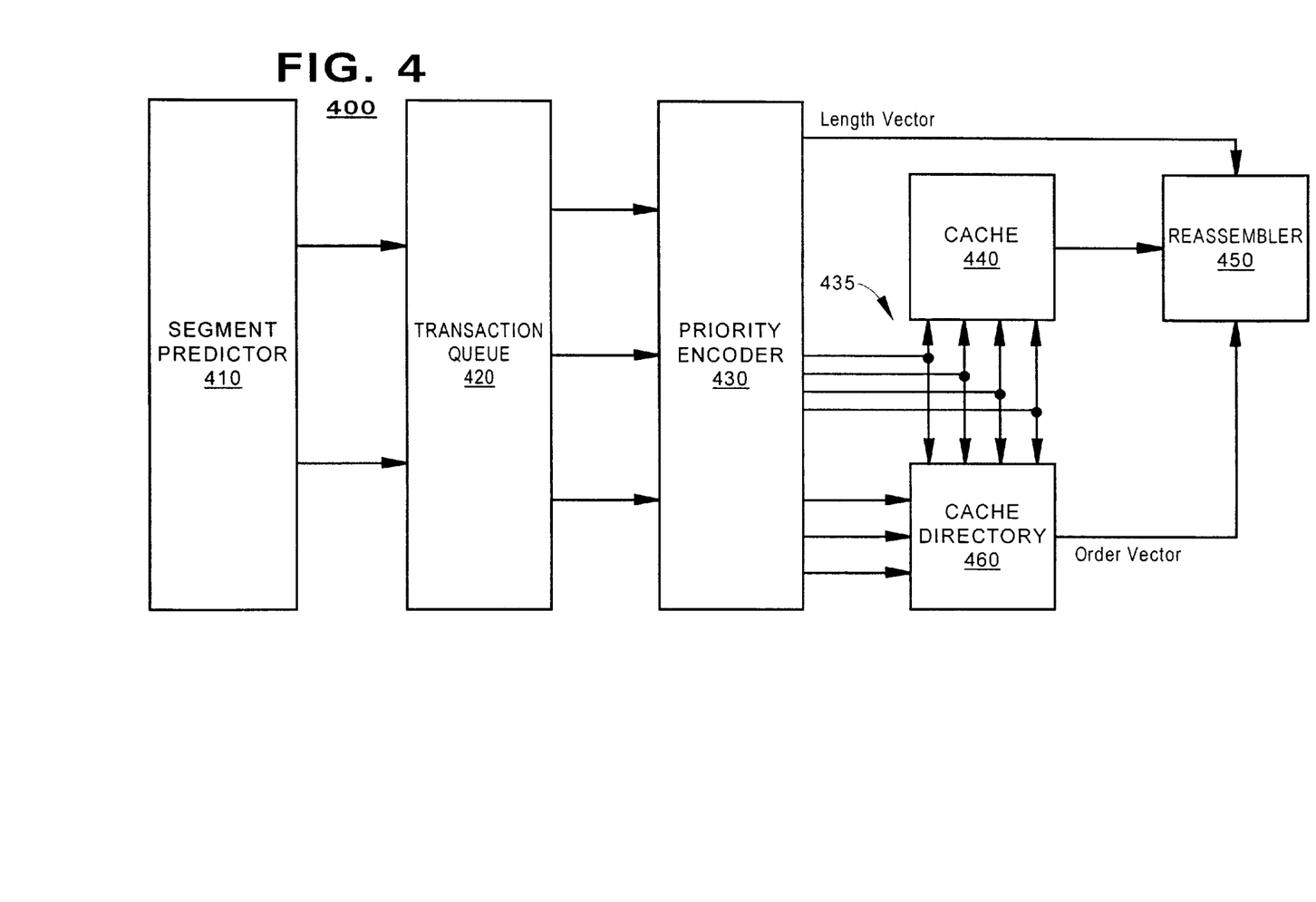
FIG. 4 illustrates a relationship between exemplary segment instructions a cache bank according to the embodiments of the present invention.

FIG. 4 is a functional diagram illustrating a addressing system 400 according to an embodiment of the present invention. The addressing system 400 may determine how the various banks in the cache 300 (FIG. 3) will be addressed. As shown, the addressing system 400 may include segment predictor 410, a transaction queue 420, a priority encoder 430, the cache 440, a reassembler 450 and a cache directory 460. On each clock cycle, based on a current state of program flow, the segment predictor 410 may predict one or more instruction segments that should be retrieved from the segment cache 280 (FIG. 2). In the example illustrated in FIG. 4, the segment predictor 410 is shown predicting the next two instruction segments; other implementations are possible. As its name implies, the transaction queue 420 may queue results from the segment predictor 410 until they are used.

The priority encoder 430 retrieves the queued prediction results and addresses the cache 440 based on bank usage. FIG. 4 illustrates four separate address lines 435 interconnecting the priority encoder 430 and the cache 440 to represent the address inputs for each bank in the cache. There may be a separate set of address lines for each bank (FIG. 3, 310.1–310.N–1) in the cache 440. Data output from the cache 440 may be reassembled by the reassembler 450. An output from the reassembler 450 may be output to the execution stage (FIG. 1, 120).

According to an embodiment, prediction results from the segment predictor 410 may include an IP of the instruction segment, a bank vector and a length vector. An instruction segment's IP may determine the set and tag data to be applied to the cache 440. The bank vector may identify which of the cache banks (310.1–310.N–1, FIG. 3) are to be addressed with the set and tag data. The length vector may indicate a length of data to be read from the cache. The cache directory 460 also may store data associated with each instruction segment, including an order vector. When an instruction segment is stored across multiple banks in the cache 440, the order vector may identify which bank stores the beginning of the instruction segment, which bank stores a second portion of the instruction segment, and so on. The order vector is useful for re-ordering the output of the cache to return the contents of each bank to its position in program order.

According to an embodiment, the transaction queue 420 may decouple timing relationships between the segment predictor 410 and the priority encoder 430. As shown in FIG. 4, the segment predictor 410 may predict a predetermined number of instruction segments to retrieve on each clock cycle. The example in FIG. 4 shows prediction of two instruction segments per clock cycle. As discussed below, however, the segment predictor 430 may predict a variable number of instruction segments from the transaction queue 420 in any given clock cycle. Buffering provided by the transaction queue 420 helps to decouple these timing relationships.

As noted above, the cache 440 may retrieve valid data from each bank (310.1–310.N–1, FIG. 3) per clock cycle. Because the length of instruction segments may vary, it is likely that some instruction segments will occupy less than the maximum number of banks that are available. A bank that does not store valid data for the highest priority instruction segment, the instruction segment at the top of the transaction queue, is free to retrieve data for another instruction segment. According to an embodiment, the priority encoder 430 may compare the bank vectors of two or more instruction segments to determine which banks to address.

Figure 5:
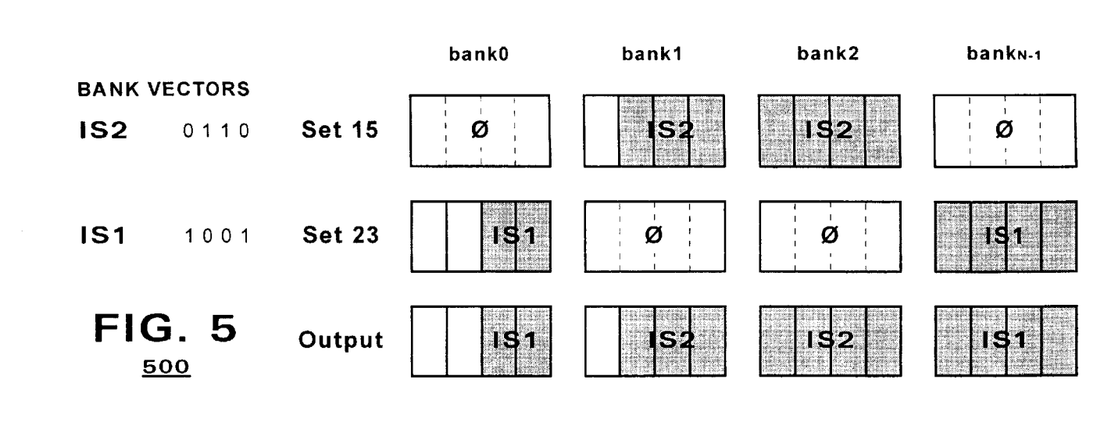
FIG. 5 illustrates exemplary operation of a cache according to an embodiment of the present invention.

FIG. 5 provides an example of two such instruction segments, IS1 and IS2 that could be stored in the cache 300 and their associated bank vectors. In this example, it may be assumed that IS1 occurs before IS2. FIG. 5 presents an example where there is no overlap between banks that store instruction segment IS1 and the banks that store instruction segments IS2. Banks 0 and N–1 are valid for instruction segment IS1 and banks 1 and 2 are valid for instruction segment IS2. Because there is no overlap between the bank vectors, the priority encoder 430 may retrieve data from all four banks simultaneously. The two instruction segments may be retrieved in their entirety in one clock cycle. Thus, FIG. 5 illustrates the output of the cache when retrieving both instruction segments IS1 and IS2 from the cache. In an embodiment, the priority encoder 430 may compare the bank vectors of the two instruction segments IS1 and IS2 to determine which cache lines to address for each bank.

Figure 6:
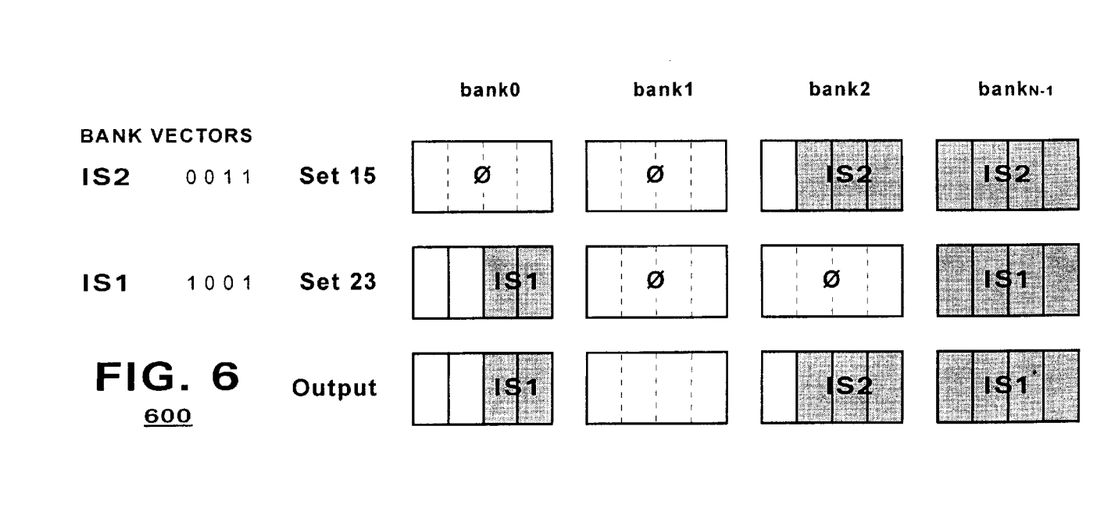
FIG. 6 illustrates exemplary operation of a cache according to an embodiment of the present invention.

A more complex situation is presented in FIG. 6. It occurs when there is partial overlap between the bank vectors. In this case, instruction segment IS1 is distributed among banks 0 and N–1 as in FIG. 5 but instruction segment IS2 is distributed among banks 2 and N–1. In this case, a bank vector comparison would indicate a conflict at bank N–1— the two instruction segments cannot be retrieved from the cache in their entirety in a single clock cycle. In this case, the priority encoder 430 (FIG. 4) may address the cache 440 to retrieve data for instruction segment IS1 in its entirety; it is first in order of program flow. The priority encoder 430 also may cause non-overlapping portions of the second instruction segment IS2 to be retrieved from the cache as well. Thus, set 15 may be addressed in $bank_2$. Only a portion of the second instruction segment IS2 will be retrieved from the cache, the other portion must be deferred another clock cycle. FIG. 6 illustrates the cache output when addressed in this manner.

Although a second instruction segment cannot be retrieved in its entirety when a bank conflict occurs, retrieval of non-overlapping portions of an instruction segment can useful if the non-overlapping portions are continuous with the preceding instruction segment, measured in terms of program flow. In the example of FIG. 6, if the instructions in $bank_2$ represent the beginning of the second instruction segment IS2, the instructions therein would be continuous with the end of the first instruction segment IS1. In this case, all the instructions read from the cache 440 could be forwarded directly to the execution unit for processing. There would be no need to wait for the remainder of the second instruction segment IS2 to be read from the cache 440.

If, however, the contents of $bank_2$ represent the end of the second instruction segment IS2, the instructions therein would not be continuous with those from the first instruction segment IS1. The instructions from the end of instruction segment IS2 could not be executed until after the instructions in $bank_{N-1}$, those of the beginning of instruction segment IS2, are executed. The contents of $bank_2$ cannot be forwarded to the execution unit in this case.

According to an embodiment of the present invention, the priority encoder 430 (FIG. 4) may address the cache 440 speculatively to cause all non-conflicting banks to be read. The data read from the cache 440 may be input to the reassembler 450 along with the order vector from the cache directory 460 identifying bank order for each of the instruction segments IS1, IS2. The reassembler 450 may cause any data from instruction segments that cannot be reassembled into a continuous instruction stream to be filtered from the output of the addressing system 400. Thus, if a portion of the second instruction segment IS2 cannot be integrated with the instructions from the first instruction segment because, for example, a bank conflict prevents another portion of the second instruction segment from being read, the reassembler 450 may cause the data to be eliminated from its output. Data for the second instruction segment IS2 would remain in the cache 440 and could be retrieved in a subsequent clock cycle when the conflict with instruction segment IS1 would be cleared. This embodiment is advantageous because it contributes to increased bandwidth—data can be read from the cache 440 while the cache directory 460 decodes the prediction data associated with the instruction segments.

Alternatively, instead of eliminating the discontinuous portion of the second instruction segment IS2, the reassembler 450 itself could include a recording mechanism such as a buffer (not shown) to preserve the data. The data may be preserved until the next clock cycle when the remaining portion of the second instruction segment IS2 could be read from the cache 440. In this alternative, preserving the discontinuous data can increase throughput from the cache 440 because the discontinuous data need not be re-read from the cache; the bank that stores the discontinuous data possibly could be used to retrieve still other data.

Figure 7:
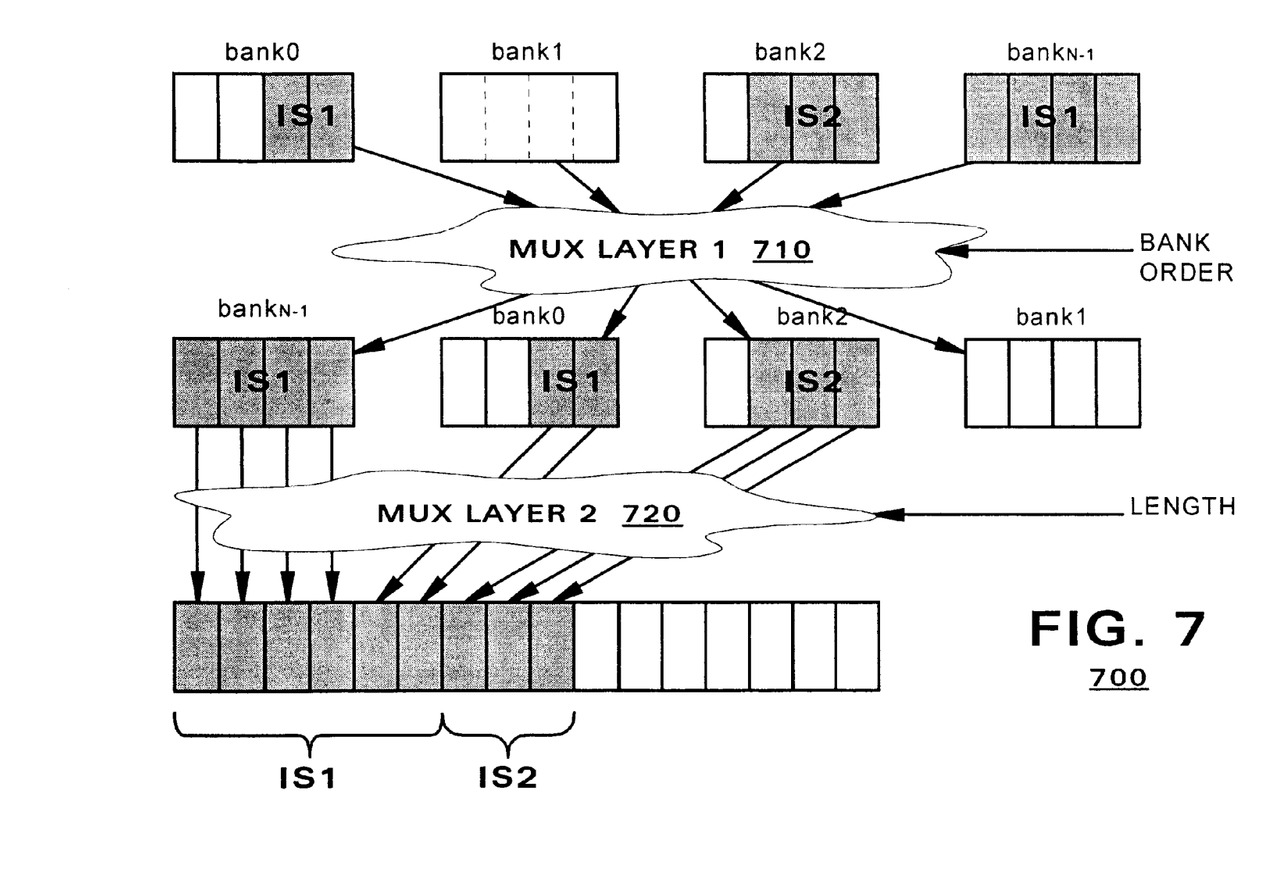
FIG. 7 illustrates exemplary operation of a reassembler according to an embodiment of the present invention.

Returning to FIG. 4, the output of the cache 440 may be input to a reassembler 450. As noted, the cache 440 need not output instructions in program order. The reassembler 450 may shift the output data as necessary to assemble a continuous stream of instructions in program order from the cache output. In the embodiment shown in FIG. 5, there can be two issues: First, the output of the banks may need to be re-ordered to preserve instruction order. Second, the banks themselves may not be fully occupied with valid data for an instruction segment (see, for example, set 23, $bank_0$). An instruction segment's order vector may identify the position of each bank within the instruction segment. A length vector may identify a length of the instruction segment. According to an embodiment, the reassembler 450 may shift the output of the cache to return the contents of the banks to program order. This function is illustrated in FIG. 7 using the exemplary data output from the cache shown in FIG. 6.

According to an embodiment, the reassembler 450 may be populated by a plurality of multiplexers (not shown) provided in a layered arrangement. A first layer of multiplexers 710 may re-order the presentation of blocks according to the order vector provided by the cache directory 460. A second layer of multiplexers 720 may collapse the instructions within the blocks according to the length vector. The output of the reassembler 450, a continuous stream of instructions is assembled, the instructions may be output to the execution stage 120 (FIG. 1) for processing.

Figure 8:
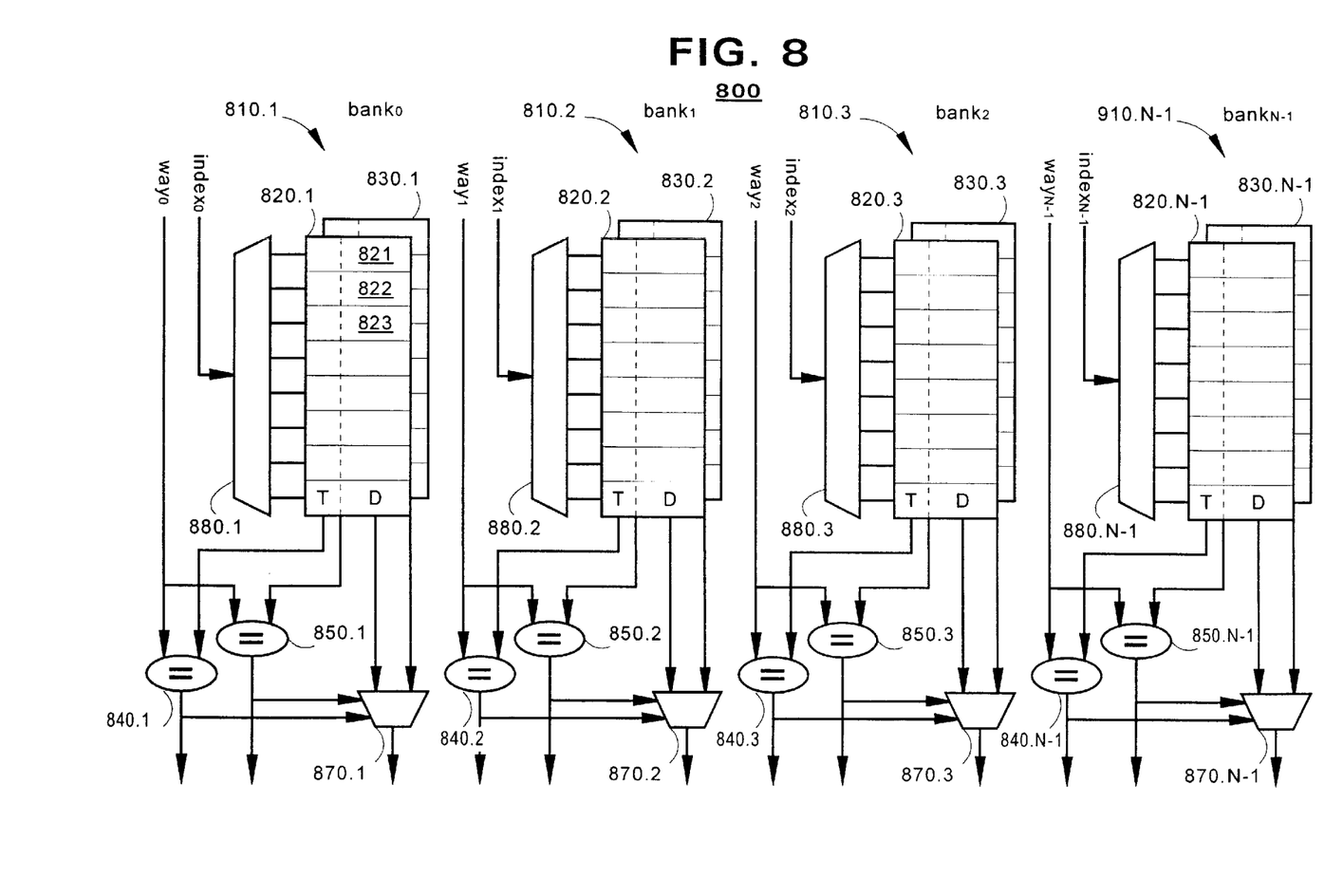
FIG. 8 is a block diagram of a cache according to an embodiment of the present invention.

FIG. 8 illustrates a cache structure 800 according to another embodiment of the present invention. The cache 800 may be populated by a plurality of cache banks 810.1–810.N–1, each of which may be addressed independently of the other. In this embodiment, each bank in the cache 800 may be a set associative cache; each bank (e.g. 810.1) may be populated by a plurality of cache entries organized into multiple ways. For simplicity, the example of FIG. 8 illustrates only two ways 820.1, 830.1 for each bank 810.1; there could be more. Each way 820.1, 830.1 may be populated by a plurality of cache entries (labeled 821, 822, 823, etc. for way 820.1). The cache entries each may include a first field T to store a tag identifier and a second field D to store data to be retrieved from the cache.

In an embodiment, a bank 810.1 may include a plurality of comparators 840.1, 850.1, one provided for each way 820.1, 830.1 of the bank 810.1. One input of each comparator may be coupled to the output of the tag field T of the respective way 820.1, 830.1. Thus, comparator 840.1 is shown coupled to the tag field T of the first way 820.1 in bank$_0$ 810.1. A second input of each comparator 840.1, 850.1 may be coupled to a common tag input for the bank. Thus, when tag data is retrieved from the ways 820.1, 830.1 of a bank 810.1, the tag data may be compared with an externally supplied tag address. A comparator 840.1, 850.1 may generate a HIT signal if the data on its inputs match each other. Because all tags in the same set in the same bank of a set associative cache must differ, only one of the comparators 840.1, 850.1 will generate a match.

Each bank 810.1 of the cache 800 may include a selection multiplexer 870.1 coupled to the data portions of the two ways 820.1, 830.1 according to an embodiment. The selection multiplexer 870.1 may be controlled by the output of the tag comparators 840.1, 850.1. Thus, the selection multiplexer 870.1 may propagate data from one of the ways, depending upon which tag comparator 840.1, 850.1, if any, indicates a match.

Each bank 810.1–810.N–1 may include an address decoder 880.1–880.N–1. In response to an applied address signal on its input, an address decoder (e.g. 880.1) may access a cache entry in each way and cause the contents stored in the respective entry to be retrieved therefrom. According to an embodiment, the data supplied to the tag input for each bank may be derived from the IP of the instruction segment. Thus, although two instruction segments may have sufficient commonality between their IPs to be stored in the same set within the cache, their IPs may be sufficiently different to have different tags. Thus, the cache structure 800 of FIG. 8 provides increase capacity over the embodiment of FIG. 3.

A cache 800 having multiple ways 820.1, 830.1 is called an "associative cache." Associativity multiplies capacity of a cache linearly with the number of ways in the cache. It also contributes to reduced thrashing of data. Consider an example where two instruction segments having a length of 10 instructions must be stored in a non-associative cache having four banks, each four instructions wide (See, FIG. 3). If the IPs of the two instruction segments having matching sets, the two instructions segments could not be stored simultaneously in the cache. Writing the second instruction segment into the cache would require over-writing data of the first instruction segment. By contrast, an associative cache can accommodate the two instruction segments; they could be stored in the same set but in different ways. The associative cache 800 reduces thrashing of data stored in the cache.

Although the embodiments described herein find application for all classes of instruction segments, they may be optimized for use in a system based upon extended blocks. For extended blocks, prediction results may include an IP of a predicted extended block, a bank vector identifying banks in a cache 440 (FIG. 4) that store valid data for the extended block, an offset vector identifying a length of data to be retrieved from the extended block and, from the cache directory, an order vector specifying bank order.

Figure 9:
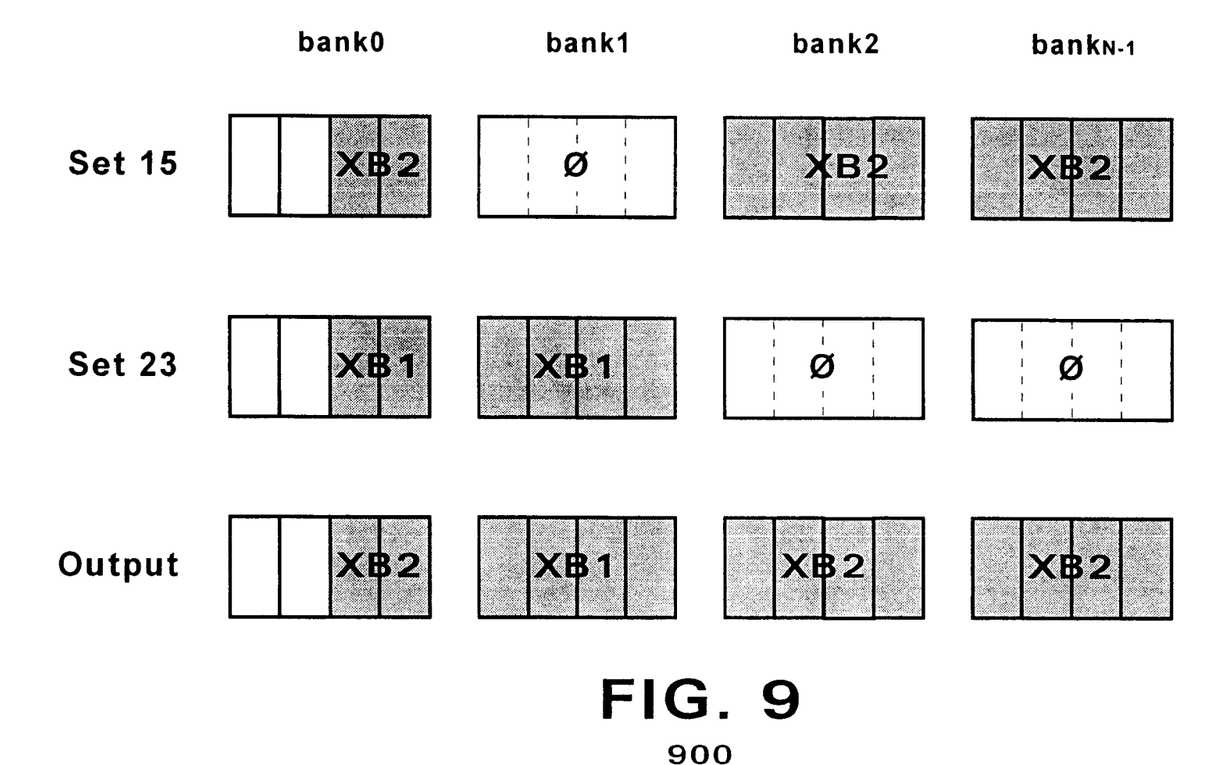
FIG. 9 illustrates exemplary operation of a cache according to an embodiment of the present invention.

Consider the example shown in FIG. 9. In this example, a first extended block XB1 may be distributed over two banks (bank$_0$ and bank$_1$) of a cache; a second extended block XB2 may be distributed over three banks (bank$_0$, bank$_2$ and bank$_{N-1}$). Assume that program flow from extended block XB1 necessarily flows to extended block XB2 as might occur, for example, from a return instruction. A conflict would occur at bank$_0$ if the full length of the extended block XB1 were required. However, because an extended block possesses a multiple-entry, single exit architecture, the full length of an extended block may not be required for each prediction. In an extended block, program flow may enter an extended block at any instruction therein but, once it does, program flow necessarily flows to the terminal instruction therein. Thus, a "referring instruction" from another instruction may determine at what point program flow will enter the extended block. Thus, in an example, a segment predictor may record different bank vectors for the same extended block based on a "referring instruction," the instruction that caused program flow to enter the extended block.

The example of FIG. 9 is continued in Table 1 below. Table 1 illustrates stored data that might be found in a segment predictor 410 (FIG. 4). The first two rows identify referring instructions that point to XB1. For the first referring instruction, a branch instruction, the segment predictor stores the IP of XB1, a bank vector identifying two banks as storing valid data and an offset identifying a length of data to be retrieved from the two banks. For the second referring instruction, another branch instruction, the segment predictor 410 stores the same IP (the IP of XB1) but the bank vector identifies a single bank as storing valid data and another offset value. The third referring instruction is the terminal instruction in XB1; it stores the IP of XB2 and respective bank and the offset vector.

TABLE 1

| REFERRING INSTRUCTION | INSTRUCTION POINTER | BANK VECTOR | LENGTH |
|---|---|---|---|
| First Branch Instruction | XB1 | 0, 1 | 6 |
| Second Branch Instruction | XB1 | 0 | 4 |
| Third Branch Instruction [From Terminal Instruction in XB1] | XB2 | 0, 2, N-1 | 10 |

Thus, bank conflicts between two extended blocks may depend upon the length of data to be retrieved from each. In the example above, there is no bank conflict between XB1 and XB2 when XB1 is entered from the second branch instruction. FIG. 9 illustrates the output of the cache 440 (FIG. 4) in this case. However, a bank conflict does occur when XB1 is entered from the first branch instruction.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A memory system, comprising:
   a cache, comprising a plurality of independently addressable cache banks, the cache to store data items having widths that can be greater than widths of the cache banks,
   an address generator coupled to the cache banks by address lines, wherein in response to identifiers of multiple data items the address generator is to:
      address all cache banks in which a first data item is stored, and
      address cache banks in which a second data item is stored provided the cache banks storing a portion of the second data item do not also store a portion of the first data item; and
   a reassembler, coupled to outputs of the cache banks, to rearrange data from the cache banks into a predetermined order.

2. The memory system of claim 1, wherein the address generator is coupled to the reassembler via a signal line identifying bank order among the cache banks.

3. The memory system of claim 1, wherein
   the first and second data items are continuous data according to a memory mapping scheme and
   the reassembler comprises a buffer to store a portion of the second data item that cannot be output as continuous data with respect to the first data item.

4. An instruction segment system, comprising:
   a cache having a plurality of independently addressable cache banks,
   an instruction segment predictor,
   a priority encoder, responsive to identifiers of predicted instruction segments from the instruction segment predictor, to:
      address cache banks storing portions of a first predicted instruction segment, and
      address cache banks storing portions of a second predicted instruction segment provided the cache banks of the second predicted instruction segment do not also store portions of the first predicted instruction segment.

5. The instruction segment system of claim 4, further comprising a reassembler, coupled to outputs of the cache banks, to rearrange data from the cache banks into a predetermined order.

6. The instruction segment system of claim 5, wherein the reassembler comprises multiple layers of multiplexers.

7. The instruction segment system of claim 5, wherein the priority encoder is coupled to the reassembler via a signal line identifying bank order among the cache banks.

8. The instruction segment system of claim 5, wherein
   the first and second instruction segments each store program instructions and are continuous with each other according to a memory mapping scheme and
   the reassembler comprises a buffer to store instructions of the second instruction segment that cannot be output from the cache as continuous with instructions from the first instruction segment.

9. The instruction segment system of claim 4, wherein the instruction segments are blocks, each a sequence of program instructions assembled in program order according to a single entry, single exit architecture.

10. The instruction segment system of claim 9, wherein the instruction segments identifiers identify an address of a first instruction in the block.

11. The instruction segment system of claim 4, wherein the instruction segments are traces, each a sequence of program instructions assembled in program order according to a single entry, multiple exit architecture.

12. The instruction segment system of claim 11, wherein the instruction segments identifiers identify an address of a first instruction in the trace.

13. The instruction segment system of claim 4, wherein the instruction segments are extended blocks, each a sequence of program instructions assembled in program order according to a multiple entry, single exit architecture.

14. The instruction segment system of claim 13, wherein the instruction segments identifiers identify an address of a first instruction in the extended block.

15. A front-end processing method, comprising:
    predicting a plurality of predicted instruction segments based on a current program state,
    queuing prediction data related to the predicted instruction segments,
    during a single clock cycle:
       retrieving prediction data from the queue of multiple instruction segments,
       for a first instruction segment, addressing banks of a cache to retrieve contents of the first instruction segment therefrom,
       for a second instruction segment, identifying other banks of the cache in which contents of the second instruction segment are stored,
       addressing the other banks of the cache to retrieve contents of the second instruction segment therefrom, and
       reordering the output of the cache to assemble a string of instructions from the first instruction segment and any portions of the second instruction segment that are continuous with the first instruction segment.

16. The front-end processing method of claim 15, wherein the identification occurs based on a comparison of offset vectors associated with the first and second instruction segments.

17. The front-end processing method of claim 15, wherein the reordering occurs based on a comparison of bank vectors associated with the first and second instruction segments.

18. The front-end processing method of claim 15, wherein the instruction segments are traces.

19. The front-end processing method of claim 15, wherein the instruction segments are extended blocks.

* * * * *